Nov. 4, 1941. J. F. PHILLIPS 2,261,486
METHOD FOR PREVENTING ACCUMULATION OF SOLIDS ON THE WALLS OF EVAPORATORS
Filed Jan. 18, 1939
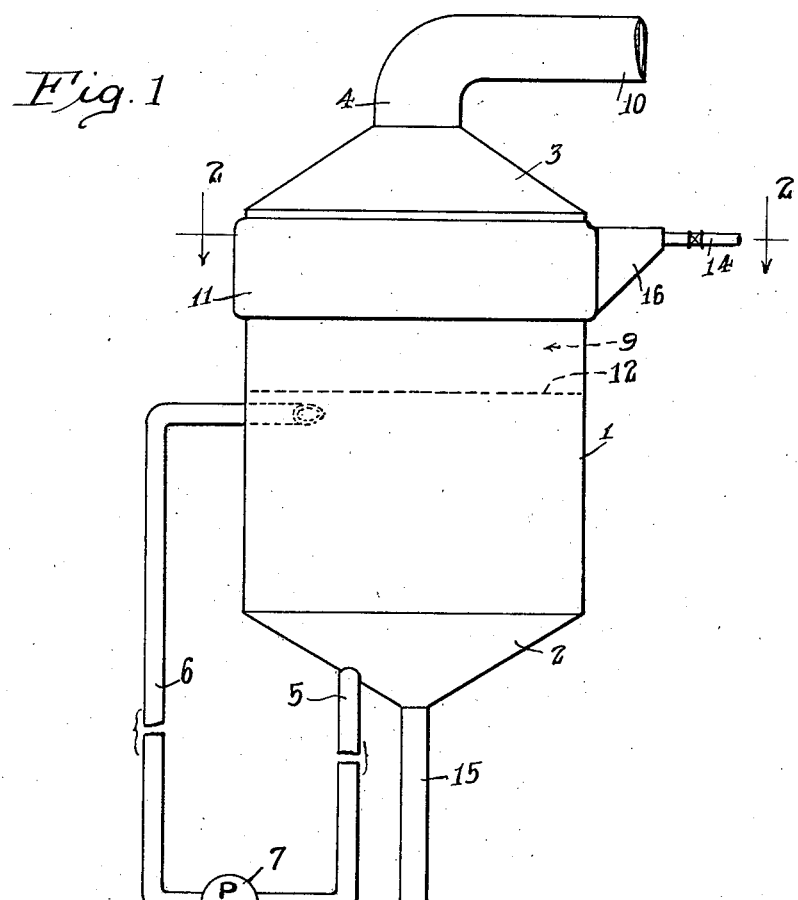
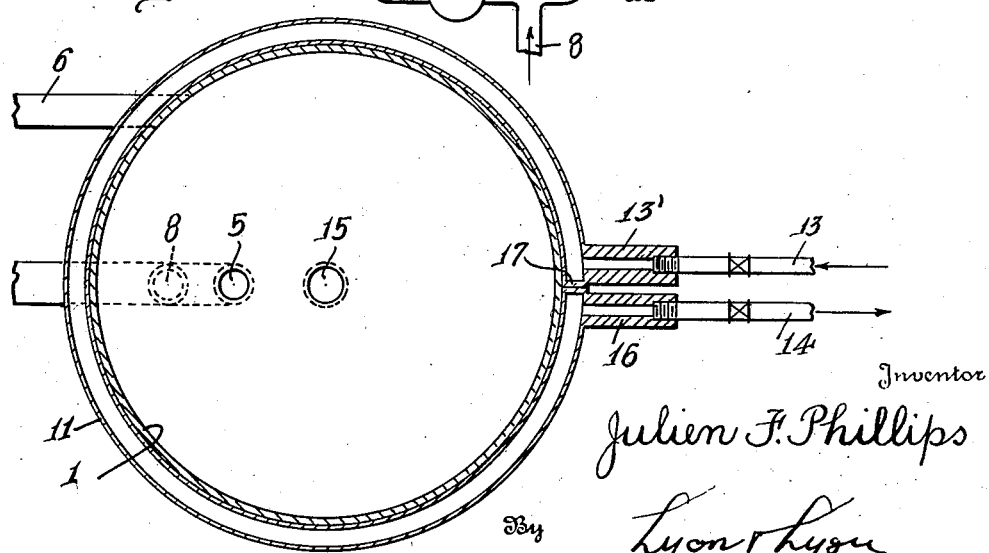
Inventor
Julien F. Phillips
By Lyon & Lyon
Attorneys Patented Nov. 4, 1941

2,261,486

UNITED STATES PATENT OFFICE 2,261,486

METHOD FOR PREVENTING ACCUMULATION OF SOLIDS ON THE WALLS OF EVAPORATORS

Julien F. Phillips, Trona, Calif., assignor to American Potash & Chemical Corporation, Trona, Calif., a corporation of Delaware Application January 18, 1939, Serial No. 251,540

2 Claims. (Cl. 159—22)

This invention relates to an evaporating method, and particularly to an evaporating method in which evaporation is accompanied by crystallization of a solute from solution.

The principal object of the present invention is to provide an evaporating method which is adapted to eliminate the accumulation of solids which commonly take place on those surfaces of the evaporating equipment which are above the liquor level or exposed to the vapor phase.

The use of evaporators and evaporative crystallizers, which includes apparatus operating under pressures above and below atmospheric in the evaporation of a solution containing the solute, has been handicapped by the accumulation of solids on the surfaces of the evaporator above the liquor level or exposed to vapors. The accumulations of solids build up on the exposed surfaces of the evaporators until they seriously reduce the capacity of the apparatus, with the result that the apparatus has to be shut down and time taken to remove the deposits. The deposits may originate either from the evaporation of solvent from solution which has "flashed" or splashed onto the exposed walls and even into outgoing vapor lines. Solids may also be entrained by the vapors and deposited directly on the exposed surfaces. These difficulties are particularly pronounced where the evaporation is conducted for the purpose of crystallizing a solute from solution within the evaporator.

One object of the present invention is to provide a method for evaporating a liquid, in which method provision is made for efficiently applying a washing fluid continuously to the exposed surfaces and to a sufficient extent to prevent accumulation of solids thereon.

It is a further object of the present invention to provide such method as will permit a quantity of washing fluid to be controlled and further to be limited to the minimum amount necessary for effectively preventing the undesired accumulation of solids.

Various washing fluids for removing solids from crystallizer and evaporator walls, such as solvents for the solids and solutions thereof, have been introduced from an outside source onto the afflicted surfaces to dissolve or wash away deposits, and also to prevent their accumulation. Various difficulties have been experienced in the removal of salt deposits from the exposed surfaces of the evaporating equipment in this manner. When the washing fluid is supplied by stationary sprays, it tends to channel down the exposed surfaces in the form of rivulets, with the result that a very large supply of washing liquid is necessary if accumulated solids are to be entirely removed or their accumulation prevented. A satisfactory system of supplying wash liquor for preventing accumulation of solids must distribute the liquor in effective quantities to all parts of the afflicted area and must do so even when the quantity of washing fluid is limited. Furthermore, the quantity of wash liquor must be controllable so that it may be easily regulated during use.

The present invention comprehends that washing fluid for removing or washing off solids which tend to accumulate on the exposed surfaces of evaporating equipment may be most conveniently and advantageously supplied by condensing upon the surfaces otherwise afflicted the vapors produced during evaporation; and, more specifically, the present invention comprehends that condensation of the vapors produced in the evaporator upon surfaces otherwise afflicted with the accumulation of salt deposits may be effectively caused to occur in such manner as to keep such surfaces clean and free of solids.

It is, therefore, a further object of the present invention to provide a method for evaporating solutions, in which condensation of a portion of the evaporated vapors upon the surfaces otherwise subject to accumulation of solids may take place, to the end that the accumulation of solids thereon may be effectively avoided.

The method of the present invention is very readily adapted to the various walls of the vapor space of the evaporator, and likewise to any of the vapor outlet lines of evaporating equipment which may otherwise be subject to the accumulation of solids. Vapors may be condensed directly within a vapor carrying member having surfaces upon which solids collect and the condensate is used immediately and directly in that member by distributing over the surfaces thereof. By this method a continuous supply of washing fluid is assured as long as the evaporator is in operation simply by maintaining the necessary temperature difference between the condenser surfaces and the vapors. Moreover, the method of the present invention prevents the addition of impurities to the evaporating system since there is no external washing fluid added to the system.

The condensation of vapors directly upon a surface produces condensate over all portions of that surface and permits the amount of washing fluid, i. e. condensate, to be reduced to a minimum while still covering the entire surface effectively. This method of supplying the washing fluid and preventing the accumulation of solids is especially useful when the quantity of solvent used must be maintained at a minimum, as when dilution of the evaporating solution must be kept as low as possible. Condensation of vapors directly upon the exposed surfaces is produced by maintaining a temperature difference between an exposed surface area and the vapors sufficient to condense and form the condensate. The exposed surface thus serves as the heat transfer surface of a surface condenser.

Various further objects and advantages of the present invention will be fully understood from the following description of a preferred form or example of a method embodying the invention. For this purpose, reference is hereafter made to the accompanying drawing, in which—

Figure 1 is an elevation of an evaporating apparatus used in the practice of the present invention.

Figure 2 is a section on the line 2—2 of Figure 1.

Referring to the drawing, the invention is illustrated as applied to the operation of an evaporator intended to act as a crystallizer, and the evaporator is illustrated as operating to produce evaporation by reduced pressure or vacuum. The present invention is particularly useful in the operation of such vacuum crystallizing apparatus, although it is obvious that the invention may be applied to various evaporating equipment in which there occurs the accumulation of solids on surfaces exposed to vapors.

In the drawing:

The evaporator is shown as comprising a cylindrical shell 1 of steel or other suitable material provided with a bottom closure 2 of conical section and a top closure 3 of conical section. The apex of the top 3, indicated as joined to a suitable vapor outlet 4, may lead to any suitable means for maintaining the evaporator 1 under a reduced pressure or vacuum, such, for example, as a barometric condenser. The particular evaporator illustrated is indicated as preferably provided with a circulating arrangement of the type shown in United States Patent No. 1,676,277, issued to R. W. Mumford on July 10, 1928, and comprising depending circulating legs 5 and 6 and actuating pump 7. Hot liquor to be evaporated and crystallized is preferably introduced into one of the depending legs from an inlet 8, and liquor and crystals circulate downwardly from the crystallizer down line 5 and return to the crystallizer through line 6, entering preferably tangentially to the shell 1. Thorough agitation of the solution to be crystallized is secured by this arrangement, particularly when the return line discharges tangentially into the shell 1 near the upper level of the liquor body therein. Excessive splashing and foaming of the liquor in the crystallizer are also prevented by the tangential return of the liquor to the main liquor body.

The crystallizer is maintained in operation filled with liquor to some level, which is preferably sufficiently below the top 3, to provide suitable vapor space 9 and prevent undue splashing of the liquor into the vapor outlet 4 and vapor line 10. The level also should be somewhat above the outlet of the inlet line 6 so that the incoming liquor will be discharged into the body of solution rather than into the vapor space. The cooled solution and crystals are indicated as removed continuously through an outlet 15 in the bottom of the crystallizer.

In crystallizing salts from solution, the solution is introduced through line 8 and the vapor withdrawal means and circulating pump 7 placed in operation. Sufficient vacuum is established by withdrawing the vapors and non-condensible gases so that the solution will boil. Continued withdrawal of the vapors concentrates the solution and also reduces its temperature through removal of the heat vaporization of the vapors. Crystallization occurs after the solution exceeds saturation with the dissolved salt. In continuous operation, cooled solution together with crystals formed are withdrawn through outlet 15 continuously, and fresh solution is continuously introduced so that the quantity within the shell 1 remains essentially the same. With the apparatus thus described solids would attempt to accumulate on the surfaces of the shell 1 above the liquor level line 12, and possibly also in the vapor outlet line 4, except for the provision of the method and means utilized for condensing a part of the evaporated vapor in such manner as to prevent such accumulation of salts. The use of the condensate itself as a washing liquid for preventing or removing such accumulated solids is of particular value since the supply of washing liquid may be automatically maintained continuous during the operation of the apparatus, and it becomes unnecessary to introduce any outside liquor with possible accompanying impurities into the evaporating equipment. Moreover, the means and apparatus of the present invention is most readily adapted to the temperature requirements of the evaporating system, thus avoiding all undesired heating or cooling of the solution undergoing evaporation, such as might occur by introducing an extraneous solution into the apparatus. Furthermore, the quantity of condensate used is subject to easy and accurate control by regulating the amount of refrigeration used in forming such condensate as hereafter described.

In the preferred form of the invention, the condensate is formed by condensing vapors directly within the vapor space, and preferably in such a manner that the condensate is readily distributed in an effective manner over the exposed surface to remove solids or prevent their deposition. Preferably, however, I make the surface to be treated serve as the condensing surface and thus cause condensation to occur directly upon the surfaces to be maintained free of accumulation of solids. The condensate is thus automatically distributed over the entire surface to be protected and is continuously supplied during the operation of the apparatus. In this way, the surface to be treated is supplied more uniformly with the washing liquid and accumulation of solids is effectively prevented by a smaller quantity of washing fluid than that which is required by other means. By having the exposed surfaces covered with condensate, crystals can not adhere but will fall immediately back into the main liquor body.

The desired effect of condensing vapors on surfaces within the vapor space is produced by maintaining the wall or other surface at a temperature somewhat below that of the vapors, with a temperature difference sufficient to cause the required condensation of a portion of the vapors of the evaporator on such surface.

In the preferred form of the invention, a refrigerant is supplied in such manner as to contact the entire exterior portion of the wall, the interior area of which is to be cooled and act as a condenser. Liquid and gaseous refrigerants, both of primary and secondary nature, may be used for this purpose.

The refrigerant is conveniently applied directly to the outer surface of the wall to be cooled by circulating it through a jacket, such as the jacket 11, which surrounds the upper part of the vapor space 9 of the crystallizer. By this means, control of the quantity of condensate is also easy, by using a refrigerant of predetermined temperature and of predetermined quantity.

Refrigerant is supplied to the jacket through a valved line 13 and withdrawn through a similar line 14. To assure even passage of the incoming refrigerant over the entire width of the jacket, I provide adaptors 13' and 16 for receiving the refrigerant before and after it flows through the jacket. One adaptor 13' receives refrigerant from the incoming line 13, while the other receives it from the jacket and discharges into the outgoing line 14. Each adaptor opens into the jacket 11 over the full height of the latter, and short-circuiting of the refrigerant is prevented by a vertical baffle 17 located between inlet and outlet adaptors, dividing the jacket at that point.

Instead of circulating the refrigerant through the jacket 11, the latter could be filled with a medium which will serve as a secondary refrigerant, and a refrigerant coil or coils immersed or embedded in the medium. Such a medium could be water or other suitable liquid, or a solid or semi-solid material which possesses a satisfactory heat transfer coefficient and can be supplied uniformly over the outer surface of the shell 1. With solid substances the jacket 11 can be eliminated as the solid forms a rigid unit alone. Insulation may be applied to the outside of such a unit. For example, a plurality of cooling coils encircling the vapor space and embedded in lead forms a strong, rigid unit which withdraws heat uniformly from all parts of the encircled wall surface.

In applying refrigeration to an evaporator wall, the lower edge of the refrigerated area is usually kept somewhat above the liquor level 12 within the evaporator to avoid direct cooling of the crystallizing liquor. If the wall area below said level 12 be cooled appreciably from the outside, solids may be deposited and built up at that point rather than removed. For this reason, I prefer to allow the area just above the liquor level to remain unjacketed, and to depend upon the flow of condensate produced at a point above the intervening unjacketed area to keep the latter free of solids. The condensation of vapors on the walls can be readily controlled by varying the quantity of refrigerant applied through the jacket, i. e., by varying the temperature and quantity of refrigerant circulating through the jacket. The total quantity of condensation required for removing solids and preventing their accumulation need be only a small part of the total vapor passing off the solution. In practice, the method used for establishing and maintaining the necessary temperature difference will depend in the main upon the temperature at which the evaporator is operating, that is, upon the temperature range of operation, and upon the actual temperature difference needed. Concentrating evaporators, for example, are usually operated at temperatures appreciably above atmospheric temperatures, and then mere exposure of the wall to the atmosphere will result in the necessary inner condensation. Thus, merely omitting the insulation usually applied to evaporators, from the area to be supplied with condensate, will in some cases suffice to condense vapors in the needed quantity. Lacking a temperature drop of acceptable magnitude between the vapors and the atmosphere, I apply a refrigerant to the outer walls of the afflicted area and thereby maintain the temperature of the inner surface below the vapor temperature.

The condenser 11 here shown as outside of the shell 1 can be placed inside thereof, adjacent the inside surface of the shell 1. Such an arrangement will be recognized as an equivalent of my preferred form since the inner surface of such a condenser would then form the inner surface of the crystallizer, upon which solids would tend to accumulate.

As an example of the benefits to be derived from my invention, I have used a jacket similar to that shown in the drawing on a ten-foot diameter vacuum crystallizer working at the rate of about 300–360 tons of refrigeration per day. The jacket was made 4 feet deep and ½ inch thick, and its lower extremity was 4 feet above the liquor level 12. About 35 to 60 gallons per minute of brine, 20–25° F. cooler than the vapor temperature corresponding with the pressure of the system, was circulated through the jacket. About 15 to 18 tons of refrigeration were thus used each day through the jacket, this corresponding to approximately 5 per cent of the vapor leaving the liquor, or about 3 pounds of water per minute. As a result of this condensation, the walls of the crystallizer remained free of deposits and the apparatus could be operated continuously. Previously, it had been necessary to shut down for about three hours every two days to wash out the unit and remove solids. In addition, the unit had an estimated higher capacity of 25 per cent with my invention in use, since prior to my work solids accumulated and formed an annulus of salt at the liquor level which decreased the capacity by that average amount during a two-day period.

While the particular form of method for evaporating liquors and preventing the accumulation of solids herein described is well adapted to illustrate the objects and advantages of the present invention, it is to be understood that the invention is not limited to the particular form shown, but is capable of considerable modification, and the invention includes all such modifications and changes as come within the scope of the appended claims.

I claim:

1. A method of preventing the accumulation of solids on the walls of the vapor space of evaporative equipment, which comprises circulating a cold fluid heat transfer medium over the outer surface of a portion of said wall at a level above the principal zone of effervescence within said vapor space, from the inner surface of which portion fluid may flow downwardly without abrupt changes in direction to the body of liquor being evaporated, whereby a material quantity of vapor being produced during evaporation condenses on said wall surface and the condensate flowing downwardly thereon retards accumulation of solids.

2. A method of preventing the accumulation of solids on the walls of the vapor space of evaporative equipment, which comprises cooling a portion of said wall appreciably above the liquor level within said equipment and from which said portion fluid may flow downwardly on the inner surface thereof without abrupt changes in direction to the body of liquor being evaporated, whereby a material quantity of vapor produced during evaporation condenses on said wall portion and the condensate flows downwardly thereby retarding the accumulation of solids.

JULIEN F. PHILLIPS.